United States Patent [19]

Kondo et al.

[11] Patent Number: 4,593,808
[45] Date of Patent: Jun. 10, 1986

[54] APPARATUS FOR ROTATING AND DRIVING HORIZONTAL RACK-TYPE CONVEYORS

[75] Inventors: Hirokazu Kondo; Asao Maruyama, both of Osaka, Japan

[73] Assignee: Tsubakimoto Chain Co., Osaka, Japan

[21] Appl. No.: 641,478

[22] Filed: Aug. 16, 1984

[51] Int. Cl.$^4$ .............................................. B65G 37/00
[52] U.S. Cl. ..................................... 198/570; 312/134
[58] Field of Search .............. 198/570, 838, 845, 860; 211/121, 122; 312/266, 268, 132, 134, 135, 280, 281, 294; 16/93 R, 93 D, 90, 91, 102, 106, 95 R, 95 D

[56] References Cited

U.S. PATENT DOCUMENTS

| | | | |
|---|---|---|---|
| 3,169,574 | 2/1965 | Behlen | 16/91 |
| 3,210,143 | 10/1965 | Frederick | 312/281 |
| 4,379,602 | 4/1983 | Iemura et al. | 312/132 |

FOREIGN PATENT DOCUMENTS

| | | | |
|---|---|---|---|
| 1189888 | 3/1965 | Fed. Rep. of Germany | 16/106 |
| 56-73328 | 6/1981 | Japan . | |
| 385735 | 3/1965 | Switzerland | 198/845 |
| 1251960 | 11/1971 | United Kingdom | 198/845 |

Primary Examiner—Joseph E. Valenza
Assistant Examiner—Kyle E. Shane
Attorney, Agent, or Firm—Dann, Dorfman, Herrell and Skillman

[57] ABSTRACT

For a multi-level rack-type conveyor having a multiple series of racks connected end-to-end to form an endless loop supported on a central standard, a rail-and-roller configuration which provides for each series of racks, an upper, inwardly-facing vertical rail surface and a lower, outwardly-facing vertical rail surface having a free upper edge. Each rack is provided with a pair of upper and lower rollers to engage the respective vertical surfaces, the lower roller having a flange adapted to ride on the free upper edge of the lower rail surface to provide vertical support for the rack. The free edge engages in the corner between the flange and the vertical roller surface to enable the flange to roll on the upper edge without slippage which causes friction and consequent noise and wear. The upper rail of one series is made integral with the lower rail of the upwardly-adjacent series by using a L-shaped member whose horizontal leg mounts the upper rail of the lower series and whose vertical leg mounts the lower rail of the upper series. The rear and under surfaces of the L-shaped member are provided with equipment-attaching and rail-attaching retaining grooves extending throughout their length and through the end portions thereof permitting a wide variety of support configurations for the rail and an infinite adjustability for mounting equipment such as sensors, limit switches and the like, along the length of the rail.

10 Claims, 5 Drawing Figures

APPARATUS FOR ROTATING AND DRIVING HORIZONTAL RACK-TYPE CONVEYORS

FIELD OF THE INVENTION

The present invention relates to conveyors and in particular to rack-type conveyors in which a series of individual racks are conveyed in a closed loop around and upright structure which may support multiple series of racks one-above-the-other. In particular the present invention relates to an improved apparatus for supporting and guiding the racks in their endless loop.

BACKGROUND OF THE INVENTION

A prior Japanese Utility Model Publication (Laid-Open No. 73328/1981) discloses an apparatus for rotating and driving horizontal rack-type conveyor, in which each horizontal rack is provided at it back portion with upper and lower rollers having vertical axes. The rollers are adapted to roll along vertical peripheral surfaces of the respective guide rails, so that the rollers can roll without slipping even at the corners of the guide rail. The vertical load on the rack is born by horizontal rollers provided on the back side of the rack. This horizontal roller has a substantially cylindrical surface so that it inevitably must slip when it rolls along any curved section of the guide rail, because the radially innermost rolling surface and the radially outermost rolling surface of the curved section of the guide rail have different lengths. The horizontal roller can roll smoothly along the straight sections of the guide rail. This slippage generates unfavorable noise and impairs the smooth and light movement of the rack along the curved section of the guide rail, while causing rapid wear of the surfaces of the horizontal rollers and the guide rail surfaces. The friction of the roller surfaces causes noises even when the roller is rolling along the straight section of the guide rail.

In another conventional conveyor including the one which employs the racks, the guide rails for the rollers attached to the upper and lower portions of the rack or like carrier are adapted to roll along upper and lower rails which are formed on the upper and lower sides of the a single guide rail member integrally therewith. Consequently, the distance between the upper and lower rails is undesirably fixed. In addition, there is no freedom of orientation of the structure which supports and mounts guide rail member. When the guide rail member is attached to the rail supporting frame, it is necessary to form bolt holes in the guide rail member to register with bolts projecting from the frame, or else to secure the guide rail member by means of welding. When bolts are used for mounting the guide rail member, the heads of the bolts or the nuts project from the inner surface of the guide rail member and may impede the running of the conveyor. When the mounting is done by welding, the guide rail member may be thermally distorted and impair the smooth running of the conveyor, thereby generating unfavorable noise. Furthermore, replacement of the guide rail member cannot be made easily when it has become worn.

SUMMARY OF THE INVENTION

Under these circumstances, the present invention aims at overcoming the above-described problems of the prior art by arranging that the vertical load of the rack is carried by vertical rollers.

The invention also provides an improve guide rail for the rollers of a conveyor system to permit an easy attaching and detaching of necessary auxiliary equipment to and from any desired position along the guide rail.

The invention also provides an apparatus for supporting and driving the racks of a conveyor such that the rollers attached to the racks can roll smoothly along curved sections of the guide rail without any slippage.

The invention is concerned also with an improved guide rail for conveyor rollers in which the orientation of the support may be freely changed.

BRIEF DESCRIPTION OF THE DRAWINGS

A preferred embodiment of the invention will be described hereinafter with reference to the accompanying drawings, wherein.

DETAILED DESCRIPTION OF THE PREFERRED EMBODIMENTS

Figure 1:
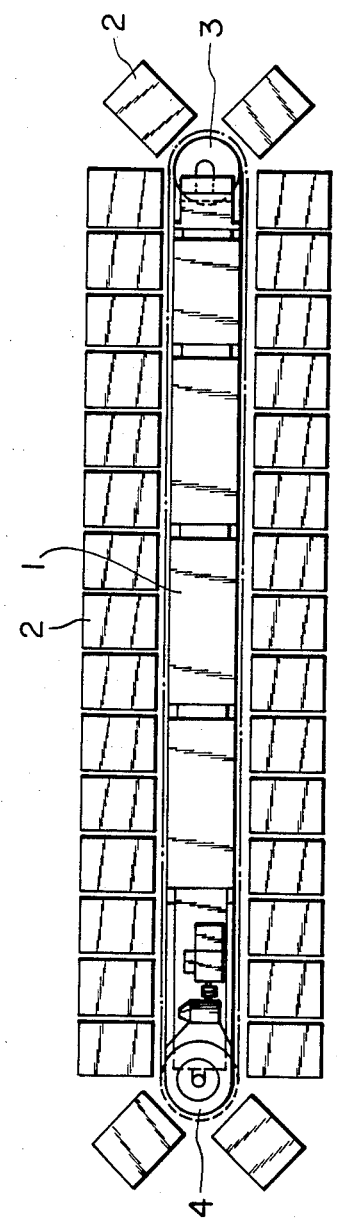
FIG. 1 is a diagrammatic plan view of an apparatus for rotating and driving a horizontal rack-type conveyor.
Figure 2:
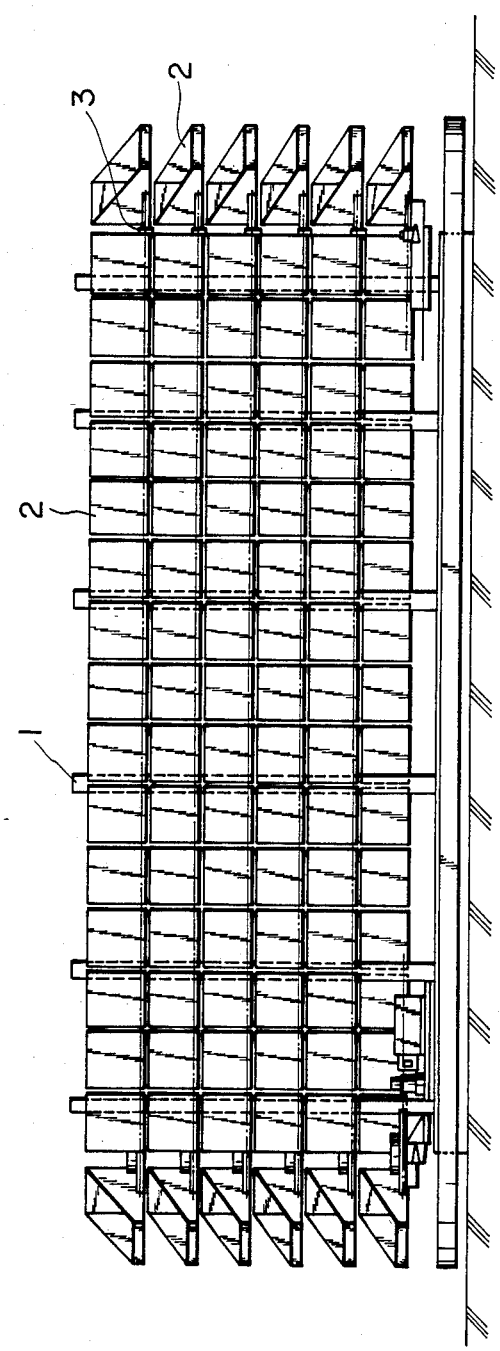
FIG. 2 is a side elevational view of the conveyor as shown in FIG. 1, illustrating a multiplicity of the rack series.

As shown in FIGS. 1 to 2, a horizontal rotary rack conveyor has a series of racks 2 connected in an endless form and adapted to go around a supporting frame 1 while being guided by a horizontal endless guide rail 3 provided on the frame. In the illustrated embodiment, multiple series of racks 2 are arranged in endless loops at different levels around the frame 1. Each series is adapted to be rotated in a horizontal plane by a manual force or by means of a mechanical drive 4.

Figure 3:
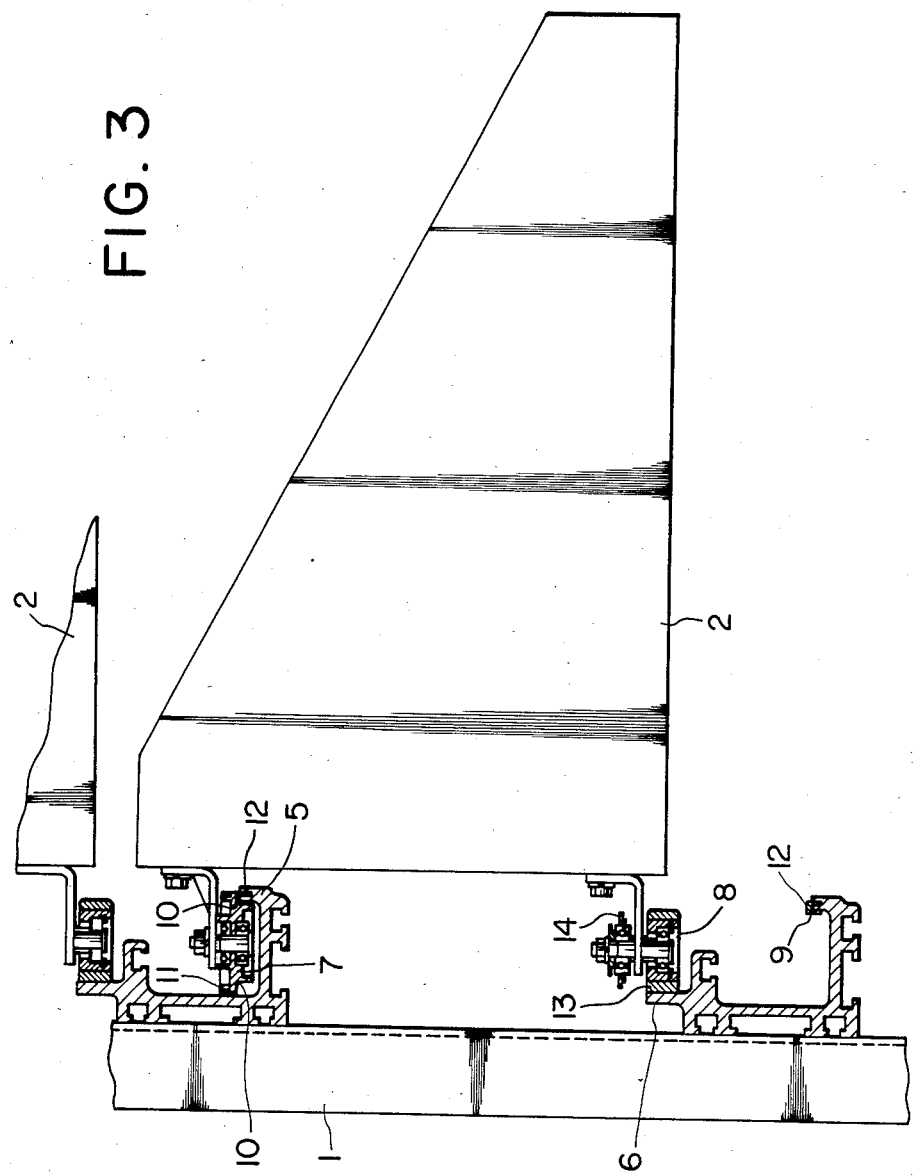
FIG. 3 is an enlarged sectional view of the support apparatus for the horizontal rack series, showing the rack in elevation.

FIG. 3 is an enlarged side elevational view of the rack 2. A vertical upper guide rail 5 and a vertical lower guide rail 6 are formed as separate members and are attached to the frame 1 such that they are spaced vertically by a suitable distance according to the height of the rack. An upper vertical roller is adapted to roll along the vertical inwardly-directed peripheral surface of the upper guide rail 5 and a lower vertical roller 8 is adapted to roll on the vertical outwardly-directed peripheral surface of the lower guide rail 6. These rollers are attached to the rear surface of the rack 2 for rotation about vertical axes. In the illustrated device, the roller axes are in vertical alignment. The upper vertical roller 7 is provided with a flange 11 having an inclined lower surface which diverges upwardly and defining a corner 10 at its junction with the cylindrical rolling surface of the roller. The flange 11 is adapted to roll on the top edge 9 of the upper guide rail 5.

It is possible to use the same material, for example either a synthetic resin or a metal, as the material of the guide rails 5,6 and the rolling surfaces of the vertical rollers 7,8. It is also possible to use the same material, for example either a synthetic resin or a metal, for the top edge 9 of the rail and the corner 10 of the flange 11. The use of the same material for mutually contacting members, however, causes a rapid wear of the contacting surfaces. It is, therefore, advisable to use different materials for the mutually contacting members. Namely, when the rolling surfaces of the rollers are made of a synthetic resin, it is preferred to use a metal as the material of the rolling surface of the guide rail. To the contrary, when a metal is used as the material of the rolling surfaces of the rollers, the rolling surfaces on the guide rail are preferably made of a synthetic resin. By so doing, the friction can be suppressed and the rolling noise is diminished, thanks to the contact between different materials. The same applies also to the contact between the top edge 9 of the guide rail and the corner 10 of the flange. In the arrangement shown in FIG. 3, even when the upper guide rail 5 and the upper vertical roller 7 are made of the same metal, the friction during the rolling can be diminished by covering the top edge 9 of the upper guide rail with a synthetic resin 12. Similarly, the friction can be suppressed by coating the rolling surface of the lower vertical roller 8 with a metallic material or a resinous material, when the lower guide rail 6 and the lower vertical roller 8 are made of the same resinous or metallic material. The invention does not exclude providing a flange on the lower vertical roller 8 instead of the flange 11 on the upper vertical roller 7, or even to provide flanges on both of the upper and lower vertical rollers.

Preferably, an O-ring or a plastic ring is fitted around the outer peripheral surface of the flange to prevent wear and noise due to direct contact between the guide rail support and the flange.

The racks may be driven mechanically or manually by a chain 14 which connects the racks 2 to form an endless train or series of racks 2 which rotate in a horizontal plane around the support structure 1.

Since the rack 2 is supported at its innermost side by the guide rails, the load carried by the rack produces a moment of force which tends to pivot the rack outwardly. This moment acts to press the rolling surface of the upper vertical roller against the vertical inner peripheral surface of the upper guide rail 5 and to press the rolling surface of the lower vertical shaft 8 onto the vertical outer peripheral surface of the lower guide rail 6 cantilever-fashion, thus carrying the moment load. At the same time, the load of the rack is carried also by the top edge 9 of the upper guide rail through the corner 10 of the flange.

The top edge 9 of the upper guide rail can be regarded as being a single line having no substantial width. Therefore, when the corner 10 of the flange rolls along the curved section of the guide rail, a smooth rolling is ensured without causing any slippage.

According to the invention, therefore, the train or series of racks can rotate within the horizontal plane along the endless path, with reduced level of noise and much suppressed friction and wear when the rack moves along the curved section of the path.

When a plurality of trains of racks are used in stages, it is preferred that the upper guide rail 5' for guiding the upper vertical rollers 7 of the underlying train of racks is constructed as a unit integral with the lower guide rail 6' for guiding the lower vertical rollers 8 of the overlying series of racks, as will be seen from FIG. 3. By so doing, it is possible to assure that there is a distance between the adjoining upper and lower series of racks. According to this arrangement, it is possible to attach two guide rails to the frame 1 by securing only one guide rail member. The tensile load applied inwardly to the upper guide rail 5' and the pressing load applied outwardly to the lower guide rail 6' combine to apply an upward moment to the guide rail member. The downward moment applied to the guide rail member by the flange 11 tending to turn the guide rail member is suppressed to reduce the net effect of the moment load which is applied to the connection between the guide rail member and the frame 1. Consequently, the construction for securing the guide rail member can be advantageously simplified.

This embodiment offers also the following advantage. Namely, since the upper guide rail and the lower guide rail for the same train or series of racks are constructed as separate members, the distance between these guide rails can be freely changed to accommodate racks of different heights on these rails. Thus, the freedom in design can be enhanced as compared with the conventional apparatus in which the upper guide rail and the lower guide rail for one series of racks are constructed as a unit integral with each other.

As has been described, according to the invention, the rotation of the racks in the horizontal plane is guided while the moment load tending to turn each rack sideways is borne by the vertical roller. The slippage between the vertical rollers and the guide rail is eliminated even when the vertical roller rolls along the curved section of the guide rail so that the racks can move smoothly and quietly. In addition, the vertical load applied to the rack is born by the flange corner portion of the vertical roller rolling on the top edge of the guide rail so that the flange corner does not cause any slippage even when it rolls on the curved section of the guide rail. Consequently, the vertical rollers, which bear the moment load tending to turn the rack and also the vertical load, can roll smoothly and lightly without slippage on the guide rail, thereby preventing friction and wear of the rollers and the rail. In addition, since the vertical load on the rack is borne by the corner of the flange, it is normally not necessary to use horizontal rollers for bearing the vertical load. Consequently, the weight of the rack is reduced to ensure a smooth running of the racks in the horizontal plane.

It is to be noted also that, since the upper guide rail for the underlying train of racks and the lower guide rail for the overlying train of racks can be formed as a unit with each other, it becomes possible to reduce and exactly set the vertical distance between adjacent series of racks, and consequently, the overall height of the rack-type conveyor may be minimized, thereby facilitating the delivery of goods to and from the conveyor. In addition, even if the height of one of the rack trains is to be changed, the desired distance between the upper and lower guide rails for such stage can be changed to meet the new height of the rack train simply by changing the position of one of the guide rail members.

Figure 4:
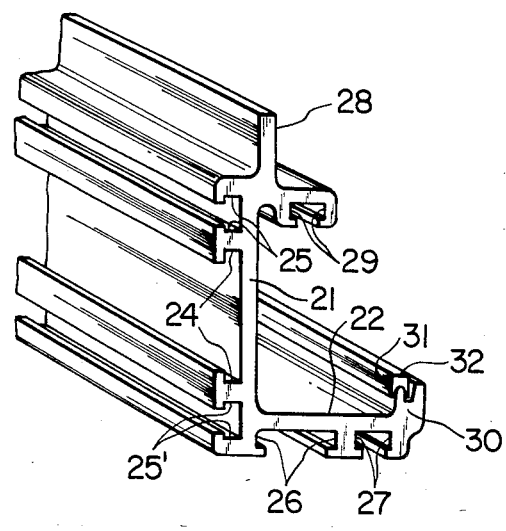
FIG. 4 is a fragmentary perspective view of a guide rail separated from its support.

A more detailed description of the guide rail will be made in connection with FIGS. 4 and 5. The guide rail shown in these figures has a substantially L-shaped form constituted by a vertical portion 21 and a horizontal portion 22 which intersect orthogonally each other. A rail-attaching retainer groove 24 of a substantial width is formed in the rear surface of the vertical portion 21 to extend longitudinally substantially at the breadthwise central portion of the rear surface. At the same time, a rail-attaching retaining groove 26 of a substantial breadth is formed in the under side of the horizontal portion 22 to extend longitudinally in the part of the horizontal portion 22 adjacent to the vertical portion 21. In addition, an equipment-attaching retaining groove 27 having a comparatively small breadth is formed in the under side of the horizontal portion 22 at the part of the latter near the free end thereof. A vertical roller-contact guide rail 28 is provided on the upper free end of the vertical portion 21. At the same time, a downward equipment-attaching retaining groove 29 is formed in a forwardly-projecting part of the upper free end of the vertical portion below the rail 28 so as to oppose or confront the horizontal portion 22. In addition, an upstanding roller-contact guide rail 30 is provided on the free forward end of the horizontal portion 22 to stand upright therefrom so as to oppose or confront the vertical portion 21. The top surface of the roller-contact guide rail 30 upstanding from the horizontal portion 22 may be covered by a covering 32 which is made of a material, for example a synthetic resin, different from the material of the roller, for example a metal. Thus, the top surface covered by the covering 32 serves as the rail edge 32 along which the flange of the roller 7' rolls.

An explanation will be made hereinafter as to the case in FIG. 5 where the conveyor rollers are the upper vertical roller 7' and the lower vertical roller 8' which are secured to the back side of a load carrying rack 2' adapted to move in the horizontal direction, as shown.

The upwardly-projecting rail 28 is offset forwardly from the vertical portion 21 a distance such that axis of the roller 8' is vertically aligned with the axis of the roller 7', the offset enabling the flange of the roller 7' to confront the portion 21 with sufficient clearance to avoid interference with its rolling movement on the rail 30, while being held captive between the rail 30 and the guide wall of the portion 21.

In this case, since the rollers 7' and 8' have aligned vertical axes, it is necessary that the wheel guide rails 28 and 30 be arranged such that their roller-contacting surfaces are maintained vertical. When the rail-supporting frame 1' is installed in the upright posture or configuration, a retaining plate 38 having bolts 37 inserted therein is placed in the wide rail-attaching retaining groove 24 in the rear surface of the vertical portion 12. The bolts are then inserted into the bolt holes formed in the rail support frame 1' and nuts 40 are screwed to these bolts to detachably fix the vertical portion 21 of the guide rail to the rail supporting frame 1'. On the other hand, when the rail supporting frame 1' is installed horizontally (not shown), the retaining plate is placed in the rail-attaching retaining groove 26 in the lower side of the horizontal portion, and the horizontal portion 22 of the guide rail is secured to the upper side of the rail supporting frame in the same manner as that explained before. If it is desired to secure a rail section with its horizontal portion 22 to the lower side of the rail supporting frame, the guide rail may be turned 180° such that the lower side of the horizontal portion 22 is directed upwardly.

It is noted that the grooves 24, 25 and 25' are symmetrical about the longitudinal centerline of the groove 24 to permit alignment of the groove 25 with the groove 25' when a rail section is inverted in this manner.

When a plurality of guide rails are connected in series at their longitudinal ends, it is necessary to eliminate any offset between the opposing ends of adjacent guide rails both in horizontal and vertical directions, for otherwise the rollers may come off the rail or there will be some other inconvenience such as noise generation resulting in an unsmooth running of the conveyor due to discontinuity of the roller contacting surfaces of the guide rails. According to the invention, it is possible to make the roller-contacting surfaces of adjacent guide rails flush with each other at the juncture portion, by placing a connecting plate in the rail-attaching retaining groove 24 or 26, or both so as to bridge between the adjoining rails. By so doing, the end surfaces of both rails at the juncture are made flush with each other thanks to the function of the connecting plate as a reference or gauge. Consequently, it is possible to connect the guide rails in series very easily and quickly. Furthermore, by loosening the attaching bolts 37, it is possible to adjust the position of the guide rail in the longitudinal direction, so that the guide rails can be mounted easily regardless of the positions of the bolt holes 39 relative the longitudinal position of the guide rail.

The equipment-attaching retaining grooves 25, 25', 27 and 29, which are formed to extend along the length of the guide rail, permit the mounting of various sensors or like equipment necessary for the operation of the conveyor, at any desired positions along the length of the guide rail, without necessitating any specific brackets or like special mounting means. various equipment or parts necessary for automatic operation of the conveyor under the control of a computer can be attached and fixed directly to the desired portions of the guide rails adjustably along the length thereof.

As has been described, the guide rail in accordance with the invention has a large degree of freedom of mounting thereof on the rail supporting member, and permits an easy adjustment of attaching position along the length of the rail supporting member. In addition, the demounting of the guide rail from the rail supporting member can be done easily. Furthermore, various sensing equipment necessary for the control of operation of the conveyor can be adjustably attached to any desired position along the length of the guide rail.

Figure 5:
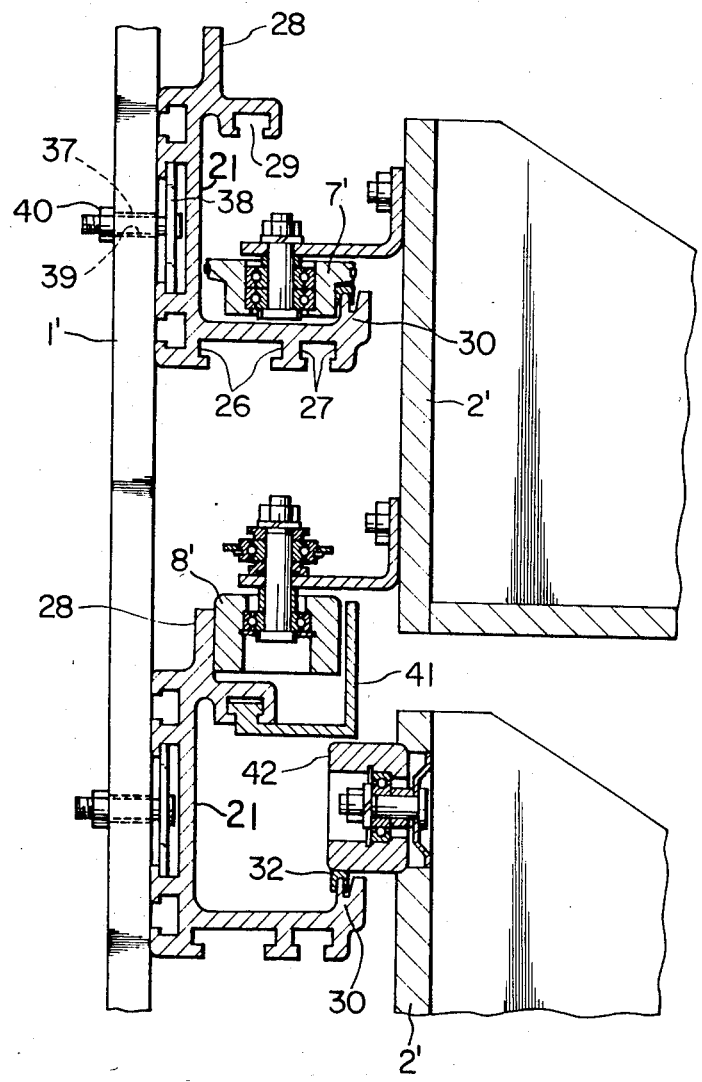
FIG. 5 is an enlarged fragmentary sectional/side-elevational view similar to FIG. 3 of the rail of FIG. 4 in use.

Since the guide rail member has a roller inner-contact guide rail and a roller outer-contact rail which are made unitary, it is possible to guide and move a plurality of rack trains or series 21 as shown in FIG. 5, by simultaneously guiding the upper and lower vertical rollers 7' and 8' by mounting the upper and lower guide rails for each rack train independently. When it is required to change the height of one of the rack trains or series, the distance between the upper and lower guide rails corresponding to the new height can easily be obtained simply by changing the positions of these guide rails on the rail supporting frame 1'. Consequently, the troublesome demounting and mounting of guide rails, which is necessary in the conventional apparatus each time there is a change of the height of the racks in one train or series, is advantageously eliminated.

When the rack 2' is guided while being cantilevered as shown in FIG. 5, there is a possibility that the lower vertical roller 8' is floated above the roller outer-contact guide rail 28 due to, for example, an external force. To avoid this problem, according to the invention, it is possible to attach a float-prevention guide wall 41 in the downward equipment attaching retaining groove 29 to provide means to hold the roller 8' captive on the rail 28.

If there is a fear that the weight of the load on the rack is so large that the load cannot be carried by the vertical roller which resists the moment load and the flange corner which bears the vertical load, it is possible to use an auxiliary horizontal roller between a pair of vertical rollers attached to the back surface of the rack, such that the auxiliary horizontal roller rolls on the top edge of the upper guide rail 30. Such a modification is shown in FIG. 5 and falls within the scope of the invention. In this modification, the horizontal roller 42 is preferably disposed on the lower rack 2' at the midpoint between a pair of vertical rollers 7', in order to diminish the slippage of the horizontal roller.

When the guide rails of the described embodiment, with various sensing equipments and other accessories attached thereto, are attached to the rail supporting frame, no projections such as heads of bolts and nuts exist on the inner surface of the rails so that the conveyor can run smoothly without encountering substantial impediment to the rolling of the rollers of the conveyor.

While particular embodiments of the present invention have been illustrated and described, changes and modifications may be made therein and thereto within the scope of the following claims.

We claim:

1. An apparatus for rotating and driving a horizontal rack-type conveyor comprising: an upper guide rail arranged in a horizontal closed loop and having a vertical rail surface facing inwardly of said loop, a lower guide rail formed separately from said upper guide rail and arranged to form a closed horizontal loop, said lower guide rail having a vertical rail surface facing outwardly of said loop, a plurality of racks connected side-by-side to form an endless rack series, each of said racks being provided at its rear side with an upper vertical roller adapted to roll on the inwardly-facing vertical rail surface of said upper guide rail, and a lower vertical roller adapted to roll on the outwardly-facing vertical rail surface of said lower guide rail, at least a selected one of said guide rail surfaces having a free top edge, the roller engaging said selected surface having a flange projecting from the rail-engaging surface of the roller to form a corner therebetween adapted to roll on the free top edge of the selected rail surface.

2. An apparatus according to claim 1 wherein said flange diverges upwardly from said rail-engaging surface.

3. An apparatus according to claim 1 wherein said top edge has a covering of a material different from the material of said corner.

4. An apparatus according to claim 1 wherein the surface of the roller is of a material different from the material on the surface of the rail which it engages.

5. An apparatus according to claim 1 wherein said flange has an O-ring seated in its outer perimeter.

6. An apparatus for rotating and driving a horizontal rack-type conveyor comprising: a plurality of vertically spaced series of racks, each series having racks connected in an endless form to form an endless rack train, an upper guide rail member for each of said series arranged in a horizontal closed loop, said upper rail having an inwardly-facing vertical rail surface, a lower guide rail member for each of said series formed separately from said upper guide rail member and arranged to form a closed horizontal loop, said lower guide rail member having an outwardly-facing vertical rail surface, each of the racks of each series being provided at its rear side with an upper vertical roller adapted to roll on the vertical inwardly-facing surface of said upper guide rail member and a lower vertical roller adapted to roll on the vertical outwardly-facing surface of said lower guide rail member, the upper guide rail member for a given one of said series being formed as a unit with the lower guide rail of the upwardly-adjacent series and having a vertical outwardly-facing surface on which the lower vertical rollers of the upwardly-adjacent series of racks rolls, while the lower guide rail member of the given one of said series is constructed as a unit with the upper guide rail having a vertical inwardly-facing rail surface on which the upper rollers of the downwardly-adjacent series of racks roll, at least a selected one of said guide rail surfaces having a free top edge, the roller engaging said selected surface having a flange projecting from the rail-engaging surface of the roller to form a corner therebetween adapted to roll on the free top edge of the selected rail surface.

7. An apparatus according to claim 6 including a guide wall for each of said vertical rail surfaces, each of said guide walls being spaced from its associated rail surface a distance slightly greater than the diameter of the roller to hold the roller captive on said associated rail surface.

8. A guide rail apparatus for rollers of a conveyor having a vertical portion and a horizontal portion connected orthogonally to each other to present a substantially L-shaped cross-section, said vertical portion being provided in the rear surface thereof with a comparatively wide longitudinal rail-attaching retaining groove and narrow longitudinal equipment-attaching retaining grooves at both sides of said rail-attaching retaining groove, said horizontal portion being provided in the lower side thereof with a comparatively wide rail-attaching retaining groove adjacent to the vertical portion and a narrow equipment-attaching retaining groove adjacent to the free end of said horizontal portion, said vertical portion being further provided with an upwardly-projecting and outwardly-facing vertical rail surface adapted to be contacted by vertical rollers of a conveyor and also with an outwardly projecting portion having a downwardly-facing equipment-attaching retaining groove confronting the horizontal portion in spaced parallel relation thereto, said horizontal portion being further provided at its free end with an upwardly-projecting and inwardly-facing rail surface opposing said vertical portion and adapted to be contacted by vertical rollers of said conveyor.

9. A guide rail apparatus according to claim 8 wherein the rail-attaching groove and equipment-attaching grooves on the vertical portion are symmetrical about the longitudinal center line of the rail-attaching groove.

10. A guide rail according to claim 8 wherein all of said grooves extend throughout the length of the guide rail apparatus and project through the end surfaces so that a common connecting piece may be positioned in corresponding grooves of adjacent rails and bridge between said adjacent rails to assure longitudinal alignment of the rail surfaces of adjacent rails.

* * * * *